DATA TRANSMISSION SYSTEM WHEREIN SYSTEM CONTROL IS DIVIDED BETWEEN A PLURALITY OF LEVELS FOR REMOTE LOCATION ACTIVATION

Filed March 16, 1966

INVENTORS
ABRAHAM BROTHMAN
RICHARD D. REISER
BY
OSTROLENK, FABER, GERB & SOFFEN
ATTORNEYS

INVENTORS
ABRAHAM BROTHMAN
RICHARD D. REISER
BY
OSTROLENK, FABER, GERB & SOFFEN
ATTORNEYS

INVENTORS
ABRAHAM BROTHMAN
RICHARD D. REISER
BY
OSTROLENK, FABER, GERB & SOFFEN
ATTORNEYS

INVENTORS
ABRAHAM BROTHMAN
BY RICHARD D. REISER
OSTROLENK, FABER, GERB & SOFFEN
ATTORNEYS

| |
|---|
| FIG. 3b |
| FIG. 3c |

DATA TRANSMISSION SYSTEM WHEREIN SYSTEM CONTROL IS DIVIDED BETWEEN A PLURALITY OF LEVELS FOR REMOTE LOCATION ACTIVATION

Filed March 16, 1966

Dec. 16, 1969 A. BROTHMAN ET AL 3,484,694

DATA TRANSMISSION SYSTEM WHEREIN SYSTEM CONTROL IS DIVIDED BETWEEN A PLURALITY OF LEVELS FOR REMOTE LOCATION ACTIVATION

Filed March 16, 1966 11 Sheets-Sheet 8

INVENTORS
ABRAHAM BROTHMAN
RICHARD D. REISER
BY
OSTROLENK, FABER, GERB & SOFFEN
ATTORNEYS

FIG. 10.

BINARY DATA BITS

| A | $b_1$ | $b_2$ | $b_3$ | $b_4$ | $b_5$ | | DECIMAL CHARACTERS |
|---|---|---|---|---|---|---|---|
| 0 | 0 | 1 | 0 | 1 | 0 | C | 0 |
| 1 | 1 | 1 | 0 | 1 | 0 | G | 0 |
| 0 | 1 | 1 | 0 | 0 | 0 | C | 1 |
| 1 | 1 | 1 | 1 | 0 | 0 | G | 1 |
| 0 | 1 | 0 | 1 | 0 | 0 | C | 2 |
| 1 | 1 | 0 | 1 | 0 | 1 | G | 2 |
| 0 | 1 | 0 | 0 | 0 | 1 | C | 3 |
| 1 | 1 | 1 | 0 | 0 | 1 | G | 3 |
| 0 | 0 | 1 | 0 | 0 | 1 | C | 4 |
| 1 | 0 | 1 | 0 | 1 | 1 | G | 4 |
| 0 | 0 | 0 | 0 | 1 | 1 | C | 5 |
| 1 | 1 | 0 | 0 | 1 | 1 | G | 5 |
| 0 | 1 | 0 | 0 | 1 | 0 | C | 6 |
| 1 | 1 | 0 | 1 | 1 | 0 | G | 6 |
| 0 | 0 | 0 | 1 | 1 | 0 | C | 7 |
| 1 | 0 | 0 | 1 | 1 | 1 | G | 7 |
| 0 | 0 | 0 | 1 | 0 | 1 | C | 8 |
| 1 | 0 | 1 | 1 | 0 | 1 | G | 8 |
| 0 | 0 | 1 | 1 | 0 | 0 | C | 9 |
| 1 | 0 | 1 | 1 | 1 | 0 | G | 9 |

C = CLEAR CODE
G = GREY CODE

INVENTORS
ABRAHAM BROTHMAN
RICHARD D. REISER
BY
OSTROLENK, FABER, GERB & SOFFEN
ATTORNEYS 3,484,694

DATA TRANSMISSION SYSTEM WHEREIN SYSTEM CONTROL IS DIVIDED BETWEEN A PLURALITY OF LEVELS FOR REMOTE LOCATION ACTIVATION

Abraham Brothman, Dumont, and Richard D. Reiser, Waldwick, N.J., assignors, by mesne assignments, to Sangamo Electric Company, Springfield, Ill., a corporation of Delaware

Filed Mar. 16, 1966, Ser. No. 534,828
Int. Cl. H04b *1/00, 7/00*
U.S. Cl. 325—55 5 Claims

ABSTRACT OF THE DISCLOSURE

System for gathering and processing data transmitted upon demand from a plurality of remote locations to a data center in which system control is divided between a plurality of levels for the activation of the remote locations, and including answer back means for establishing the existence of valid connections between the data processing center and the remote locations. First level locations have talk-listen circuits enabling two-way transmissions and include outputs to associated second level locations. Remote locations include a selective ringing circuit responsive to individual signals to energize its transmitter means for transmission of its data to the associated second level locations.

The instant invention relates to communication systems and more particularly to a telemetry communication system preferably adapted for use as a private wire system for gathering data representative of meter readings and the like, from a plurality of remote locations or points of differing levels at a central station location.

Telemetry systems are employed in a wide variety of applications. One typical application for telemetry systems, which is presently developing into widespread use is that of automatic meter reading. This application basically consists of a collection of data representative of meter readings from a plurality of remote points at a central station for a variety of purposes. As one example, in automatic meter reading systems data representing the readings of watthour meters, water meters, gas meters and the like, are transmitted on demand and through a communications medium to a central station for mass processing of the data. In the case of utility meter readings, the data collected serves as a means for billing customers receiving such service within the network. In the case of watthour meter readings, for example, the data may be employed to adjust system operation so as to make optimum use of the power supplied in the system. As one example, data collected from the system subscribers may be employed to adjust the power sources within the system to accommodate peak and off-peak loads on a continuous basis. As another example, in systems in which a plurality of generating sources are employed, a collection of data may be utilized to establish the shifting of power needs throughout the system on a continuous basis so that the power generating sources may be adjusted to accommodate the shift in power needs in order to optimize the economic dispatch of power to the system and hence, operate the power network in a most economic fashion.

Since the communications system is compeletely unconcerned with the source from which it collects data, and the actual service which the data represents, it is possible to collect data from a plurality of meters and other recording instruments which are totally unrelated to one another. For example, in addition to collecting data from gas, water and electric meters, it is possible to gather data from instruments recording vars, power factor, pay TV, recording meters, temperature measuring meters, and a plurality of other diverse recording instruments. By appropriate selection and design of such a communications system, it thereby becomes possible to gather and process data from already existing recording instruments such as electric, gas and water meters and to provide the system with additional flexibility so as to gather data from other recording instruments which may be coupled with the system some months or years after its installation and which data may be collected in a routine matter with no substantial changes being required in system design.

The instant invention performs all of the functions mentioned above, while at the same time transmitting data reliably and relatively high speeds and is adaptable for use with any desired communications medium, but is preferably adapted to function advantageously in a private wire communications network.

The system of the instant invention is comprised of a data processing center having a quiescent operating state wherein all of the remote locations of the system are sequentially sensed so as to transmit their readings back to the data processing center for billing, system control and other desired functions. The data processing center is sequentially operated through either manual or automatic means which keeps a decimal count of each operation as it steps to the next point which it desires to make contact with. This decimal count is converted into two part binary information with the first binary information part being utilized to select the remote location identified by the decimal value at any given instant and with the second binary information part being utilized to form the transmit request signal acting to initiate the remote receiver which is being selected to transmit. This two part binary information is impressed upon a concentrator which selects the particular substation based upon the binary coded information first part and which transmits the binary coded information second part to the particular substation selected.

The selected substation is provided with receiving means for receiving the binary information second part. This information is then decoded to establish the presence of a valid signal. In the case of a valid signal, the information is then impressed upon a substation concentrator which then selects the particular central station having the meter reading data which the data processing center desires to collect at that given instant. The decoding circuitry, having established the presence of a valid binary code, is provided with transmission means for transmitting back to the data processing center a valid signal indicative of the fact that the substation acknowledges receipt of a valid code.

Simultaneously therewith, the substation concentrator selects the particular central station line and couples the selective ringing signal to this line. The selective ringing signal which identifies the particular central station to be reached impresses this signal upon all central stations connected with the particular substation simultaneously. Each central station receives the central office identifying code being transmitted and compares it with its own identifying code. When the comparison proves valid, which is the case for only one such central station at any given instant, the selected central station transmits back through the substation its address which serves as an acknowledgment that it has received its identifying code and conditions the data processing center to place itself in a state to receive binary data from all points connected to the central station.

The central station, which as one example, may be mounted upon the top of a pole at some remote location, is designed to serve as the connecting link between the data processing center and a plurality of remote points which it may selectively connect to the data processing center under control of a selective ringing signal. The remote points which are all connected to the central station, may, for example, be the individual houses or apartments of subscribers to the network with each house being provided with means for transmitting information such as watthour, gas, water, subscription TV, and like metering information. In addition thereto, other metering information may be connected to the central station such as protection information which may indicate the condition of equipment in the network such as circuit breakers and power lines, or it may constitute other data to be collected which, while not representative of needed information at the subscriber location, is nevertheless important to the system such as, for example, power factor readings, var meter readings, and so forth.

Each type of metering information to be transmitted is provided with a circuit for receiving the selective ringing signal for the purpose of energizing the remote location transmitter to transmit the meter readings on demand upon receipt of the signal. Each such remote location is provided with means for energizing the transmitter responsive to its own specified selective ringing signal frequency.

Thus, each remote location connected to a specified central station simultaneously receives the selective ringing frequency signal but only one of these remote locations is responsive thereto acting to energize its transmitter for transmitting the meter data in binary coded form coupled with the identifying code of the particular point. Each remote point connected to a given central office is designed to be responsive to a different selective ringing frequency signal so that only one remote location at any given instant will become operative to transmit its data.

In applications where a single subscriber location identified by a single location identifying code is desirous of transmitting information from a plurality of meters at this single location, a programming means is provided for sequentially coupling each individual meter to the link so that this data may be transmitted in a sequential fashion. Each such remote location is provided with means to transmit an end of data signal causing the data processing center to transmit a selective ringing frequency signal operative to energize the next remote location at that central station to transmit data.

The data processing center is provided with receiver means for receiving the message from each remote location, which message contains coded data and synchronizing data. The message is received at the data processing center receiver means which loads the code bits into shift register means at a speed controlled by the synchronization data. The character loaded into the register means is then examined by error logic to establish its validity. If invalid, a repeat signal is transmitted requesting the message which was received as errored to be retransmitted.

If the received character, after error logic examination, proves valid, the character is shifted into the code translation logic converting the binary coded data into a form more suitable for billing and/or computational purpuoses. After code translation, each character is fed into intermediate memory means and buffer storage means where it may be ultimately fed either into a computer means or to other storage means such as magnetic tape, punch cards, or both magnetic tape and punch cards recording devices, if desired.

Once the central station pole top location has received a combination of tones representative of its identifying code, the central station operates a confirm-word programming means which transmits its central station identifying code back through the substation to the data processing center which acts to acknowledge the fact that it has received a valid code tone combination and is about to undergo transmission of the points connected thereto such as, for example, the home meter reading positions which are connected in party line fashion to the pole top location.

The substation concentrator means at each substation location is likewise connected in party line fashion to all of the pole tops associated with the particular substation and operates in such a fashion as to monitor and scan each pole top location on a one-at-a-time basis in order that each remote location affiliated with that substation may begin transmission. At the completion, with transmission of all pole tops and hence remote locations at each pole top for a substation location, the next substation location is then signaled from the data processing center.

Each pole top is provided with total relaying circuit means for the purpose of sequentially energizing the transmitter at each subscriber location so that it may energize upon demand thereof in order to transmit its meter condition back through its pole top an its substation to the data processing center. Each subscriber location is provided with normally deenergized frequency sensitive circuit means which is designed to become operative and to oscillate at a predetermined frequency upon receipt of a transmit request signal which is substantially of the same frequency as the frequency to which the oscillator circuit is tuned. When this frequency signal is received the circuit begins oscillation and causes its programmer means to sequentially transmit through the oscillator circuit the binary coded data representative of the meter readings at each location. Also coupled with the generation of data transmitted are synchronizing bits interspersed with data bits employed for the purpose of synchronously operating the data processing center data receiver under control of sync bits generated at each remote location. This avoids the need for providing synchronous motors or other such means which are normally required in order to assure synchronous operation between each remote transmitter and the data receiver at the data processing center.

In applications where subscriber locations are designed to transmit plural information such as watthour meter, gas meter, water meter, subscription TV meter, and protection logic information, sequencing means are provided at such plural meter installations at a single location which is designed to step through each meter programmer at the specified location enabling all of the meter readings at the single location to be transmitted simply through energization of the sequencing means at the remote location which has plural meter points.

The system of the instant invention thereby provides means for gathering data from an extremely large plurality of remote locations at a central data processing point having a plurality of security levels in order to establish valid inter-connection between the data processing center at each remote location and further provides means where a plurality of meter points having unrelated meter information may all be gathered and processed at a single location, thereby substantially diminishing the operating costs of such a system through the sharing of the system by a plurality of independent and unrelated groups. The system is provided with sufficient versatility and flexibility so as to enabling additional metering points to be added to existing central office locations with little or no additional changes being required to the system and its operation to accommodate additional metering points.

It is therefore one object of the instant invention to provide a meter reading system for gathering data from a plurality of remote locations of differing levels at a central location capable of accumulating and processing such data.

Another object of the instant invention is to provide an automatic system for collecting and processing data transmitted upon demand from a plurality of remote locations to a data center and having answer-back means for establishing the existence of valid connections between the data processing center and the remote location.

Another object of the instant invention is to provide an automatic system for collecting and processing data transmitted upon demand from a plurality of remote locations to a data center and having answer-back means for establishing the existence of valid connections between the data processing center and the remote location wherein a plurality of levels of answer-back capabilities are provided.

Still another object of the instant invention is to provide novel automatic means for gathering data transmitted upon demand from a plurality of remote locations to a processing center wherein novel frequency sensitive circuits are employed at the remote locations for initiating remote location transmission upon receipt of the appropriate frequency to which the remote location is adapted to respond.

Another object of the instant invention is to provide novel automatic means for the gathering and processing of data transmitted upon demand from a plurality of remote locations to a processing center wherein the system is provided with a plurality of levels of connection between data center and remote points including independent and party line type connections.

Still another object of the instant invention is to provide novel automatic means for the gathering and processing of data transmitted upon demand from a plurality of remote locations to a processing center wherein system control is divided between a plurality of levels for the actuation of remote points.

These and other objects of the instant invention will become apparent when reading the accompanying description and drawings in which.

Figure 2:
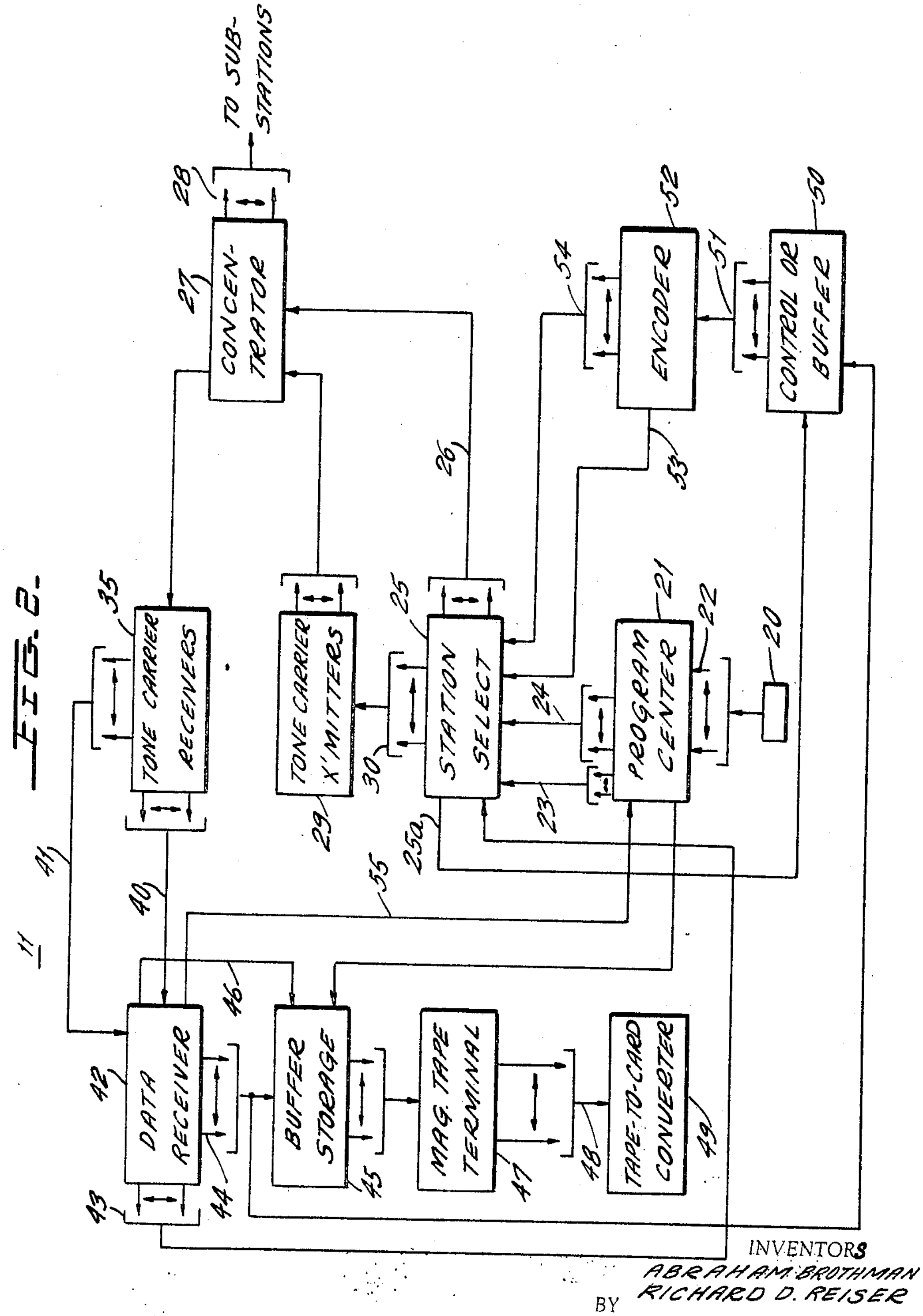
FIGURE 2 is a block diagram showing the data processing center of FIGURE 1 in greater detail.
Figure 2A:
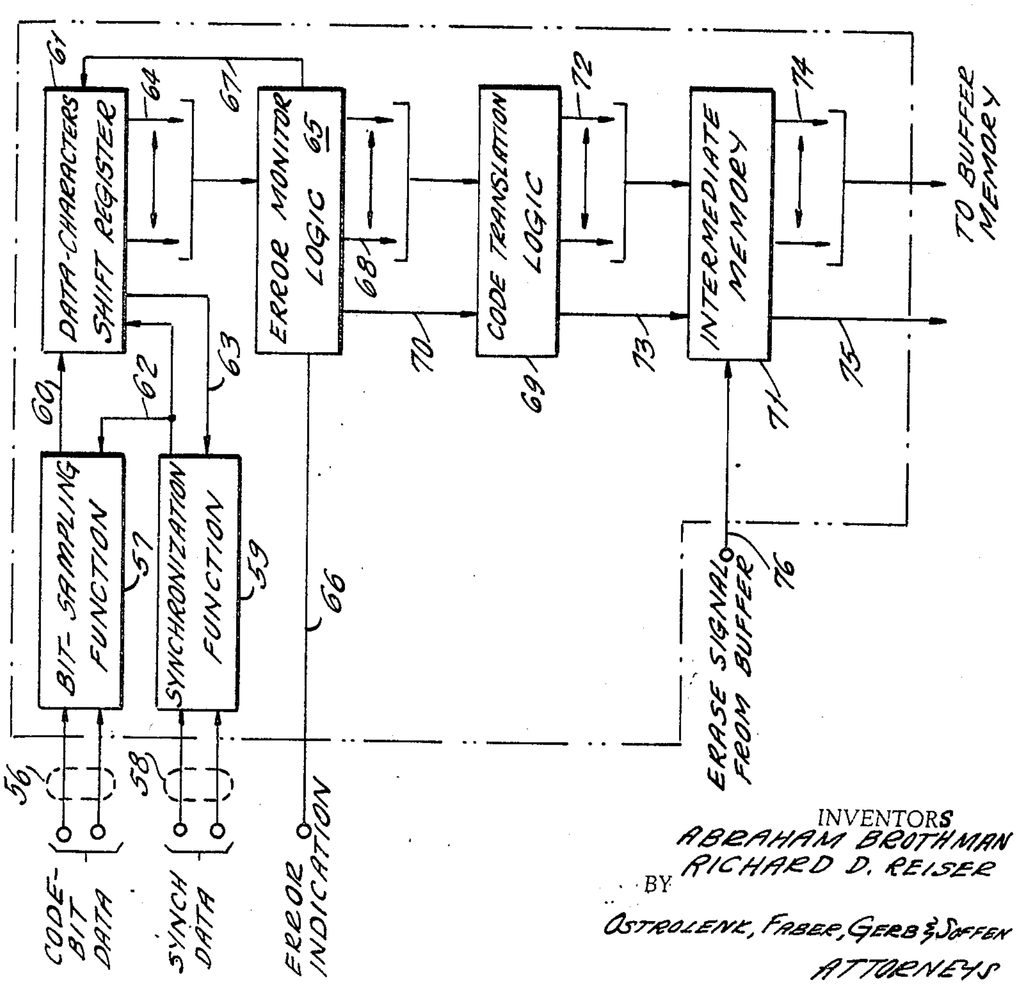

FIGURE 2*a* is a block diagram showing the receiver portion of the data processing center of FIGURE 2 in greater detail.

Figures 1, 3D:
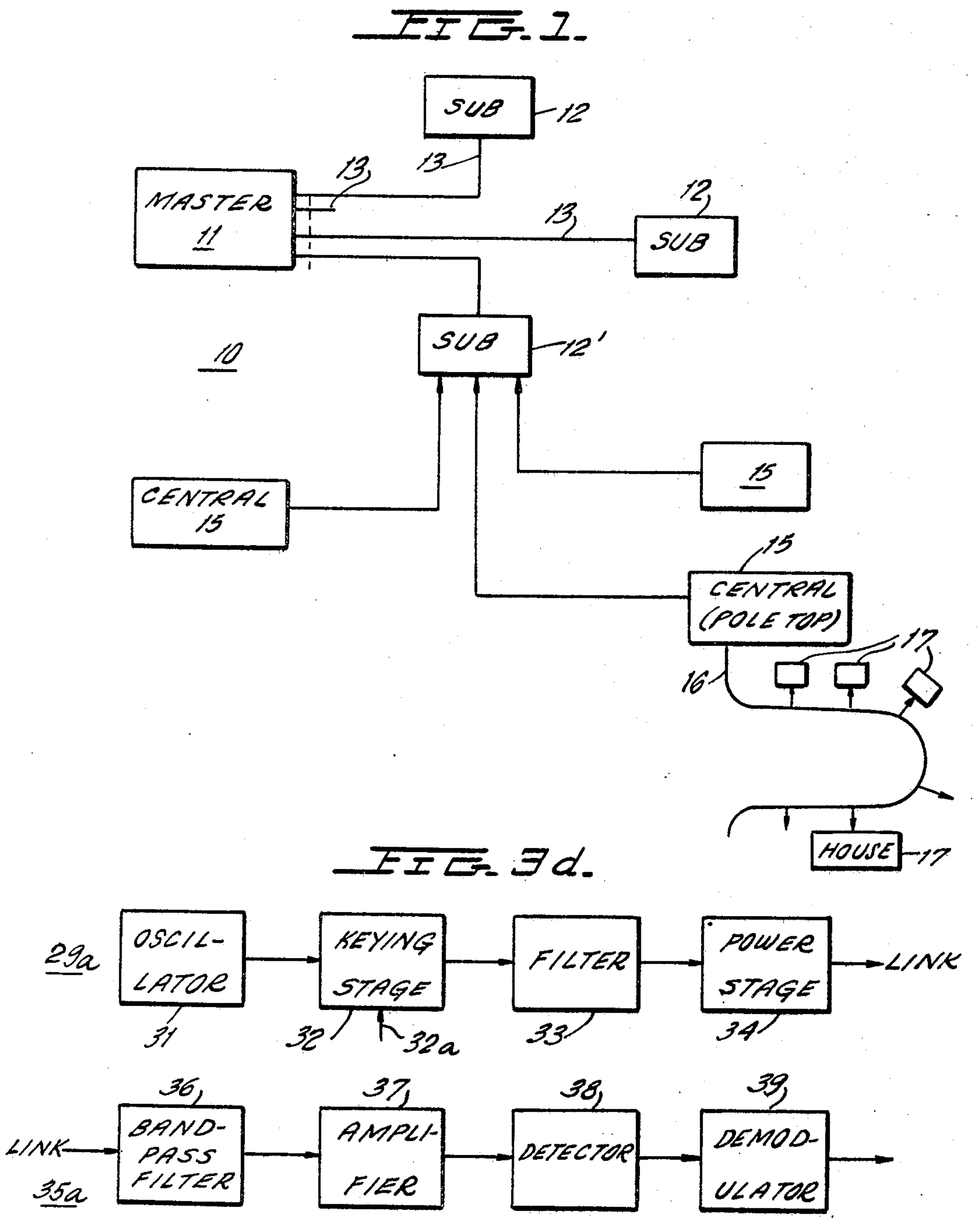
FIGURE 1 is a block diagram showing an automatic data gathering and processing system designed in accordance with the principles of the instant invention.
Figure 3:
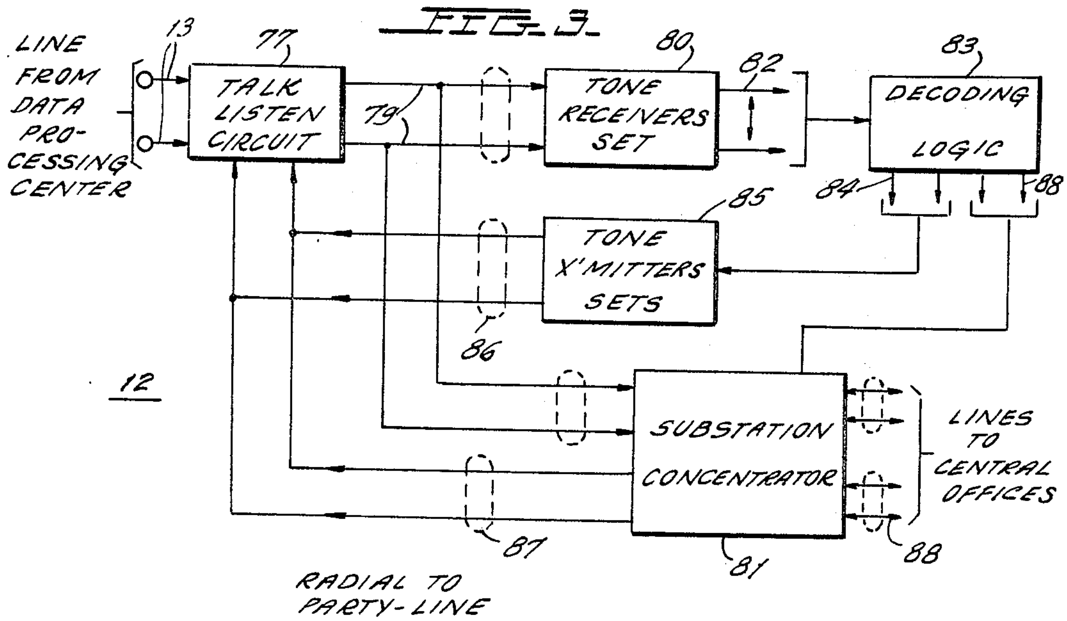

FIGURE 3 is a block diagram showing the substation system of FIGURE 1 in greater detail.

Figure 3A:
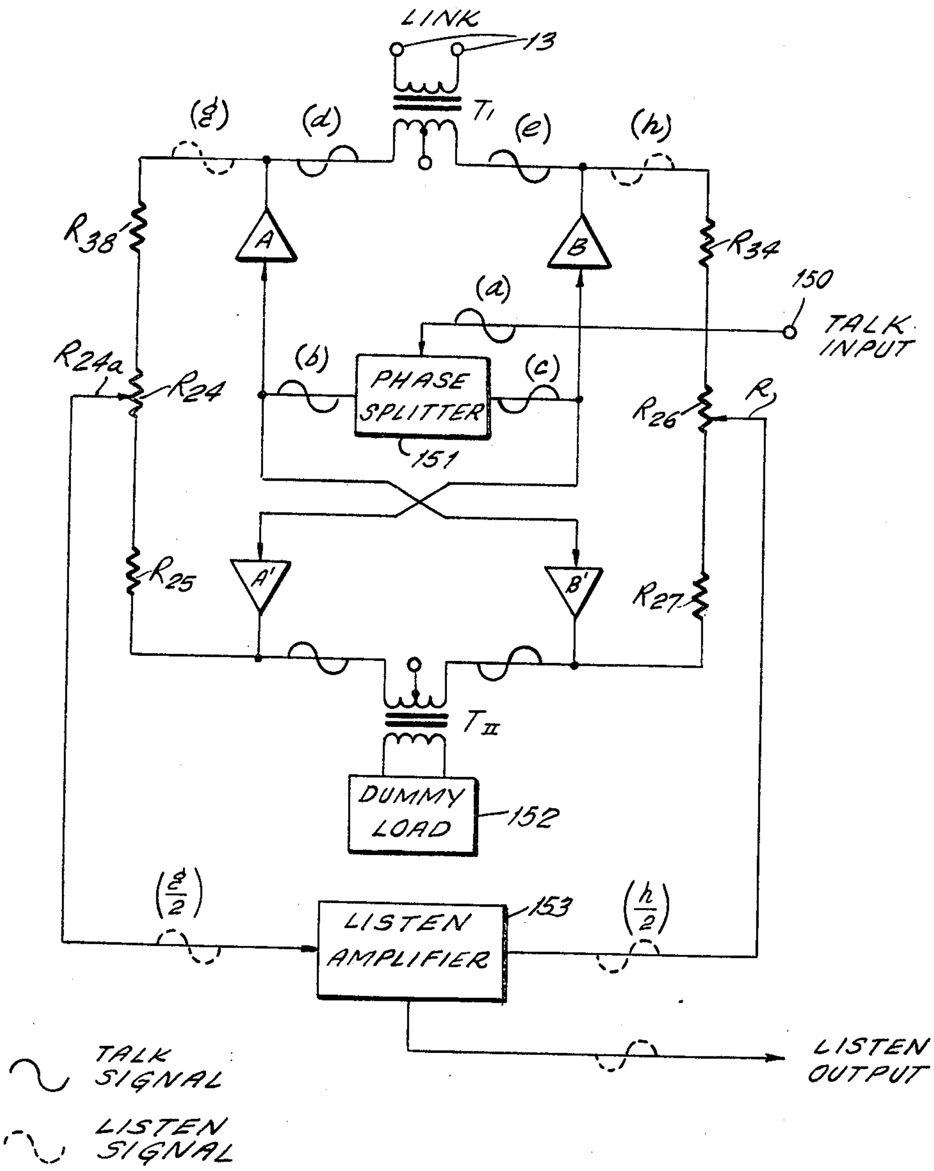

FIGURE 3*a* is a block diagram of the talk-listen circuit of FIGURE 2.

Figures 3B, 3E:
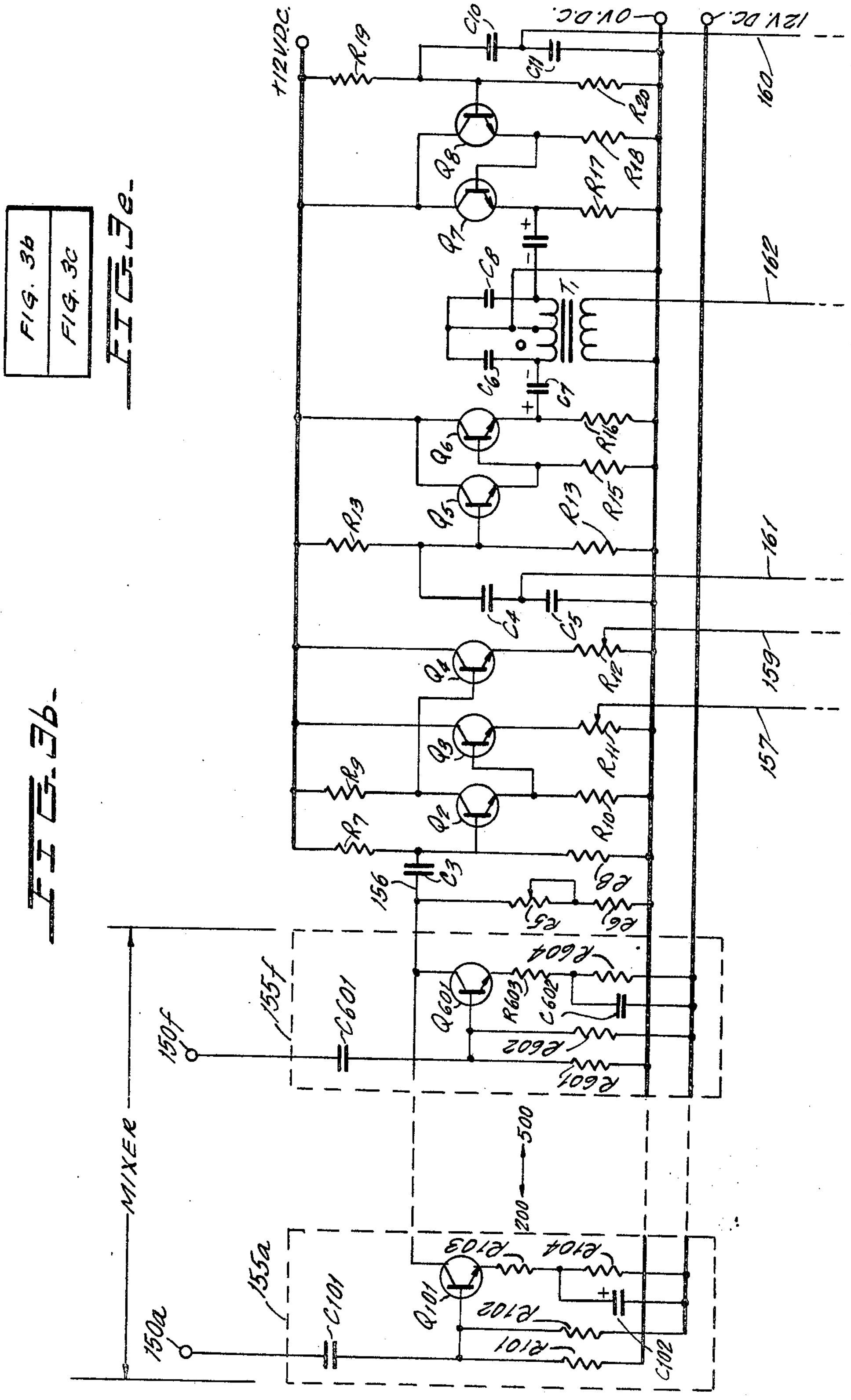
Figure 3C:
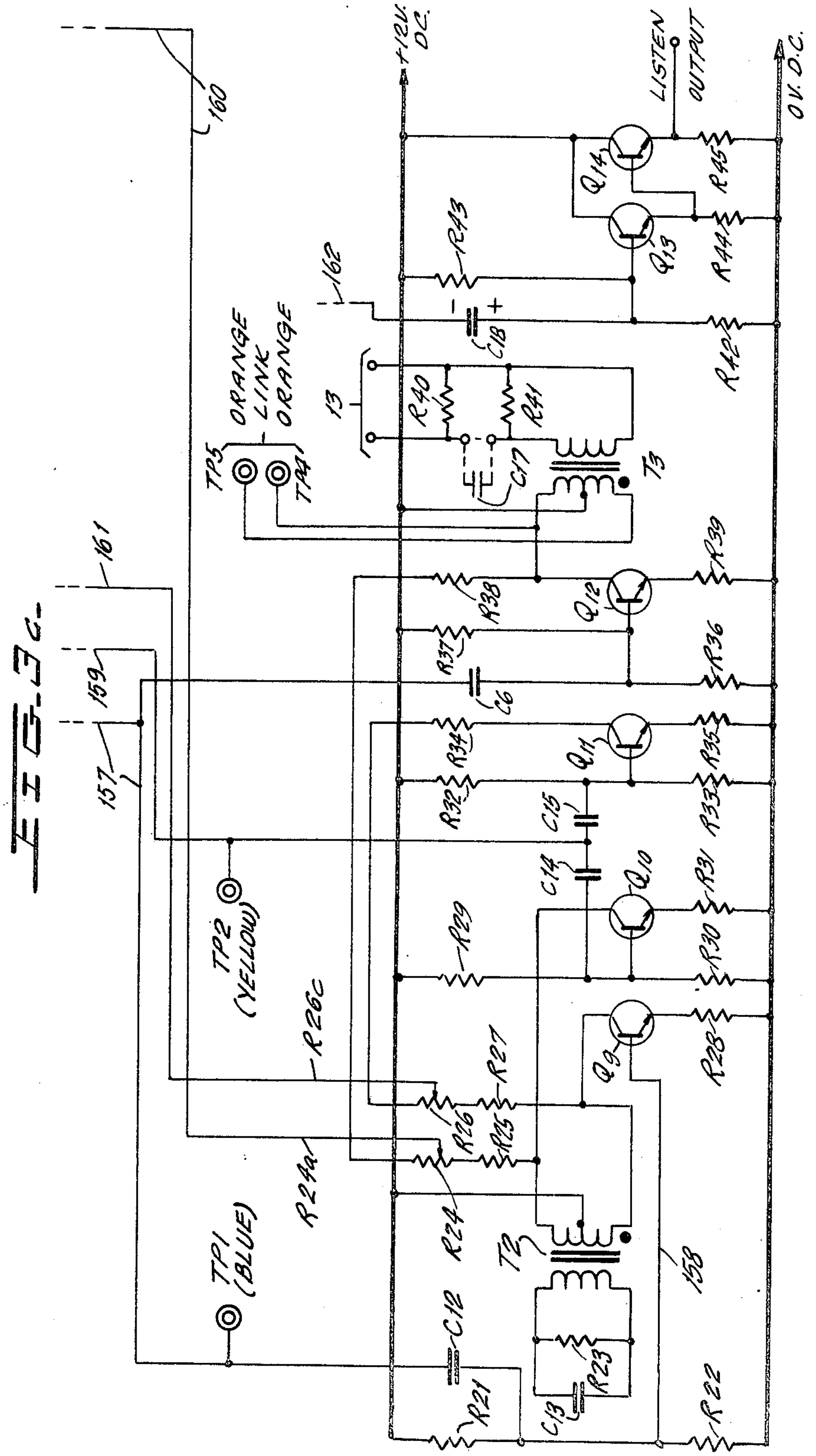

FIGURES 3*b* and 3*c* are schematic diagrams of the talk-listen circuit of FIGURES 2 and 3*a*.

FIGURE 3*d* is a block diagram of the tone transmitters and tone receivers.

FIGURE 3*e* is a block diagram showing the manner in which FIGURES 3*b* and 3*c* are arranged.

Figure 4:
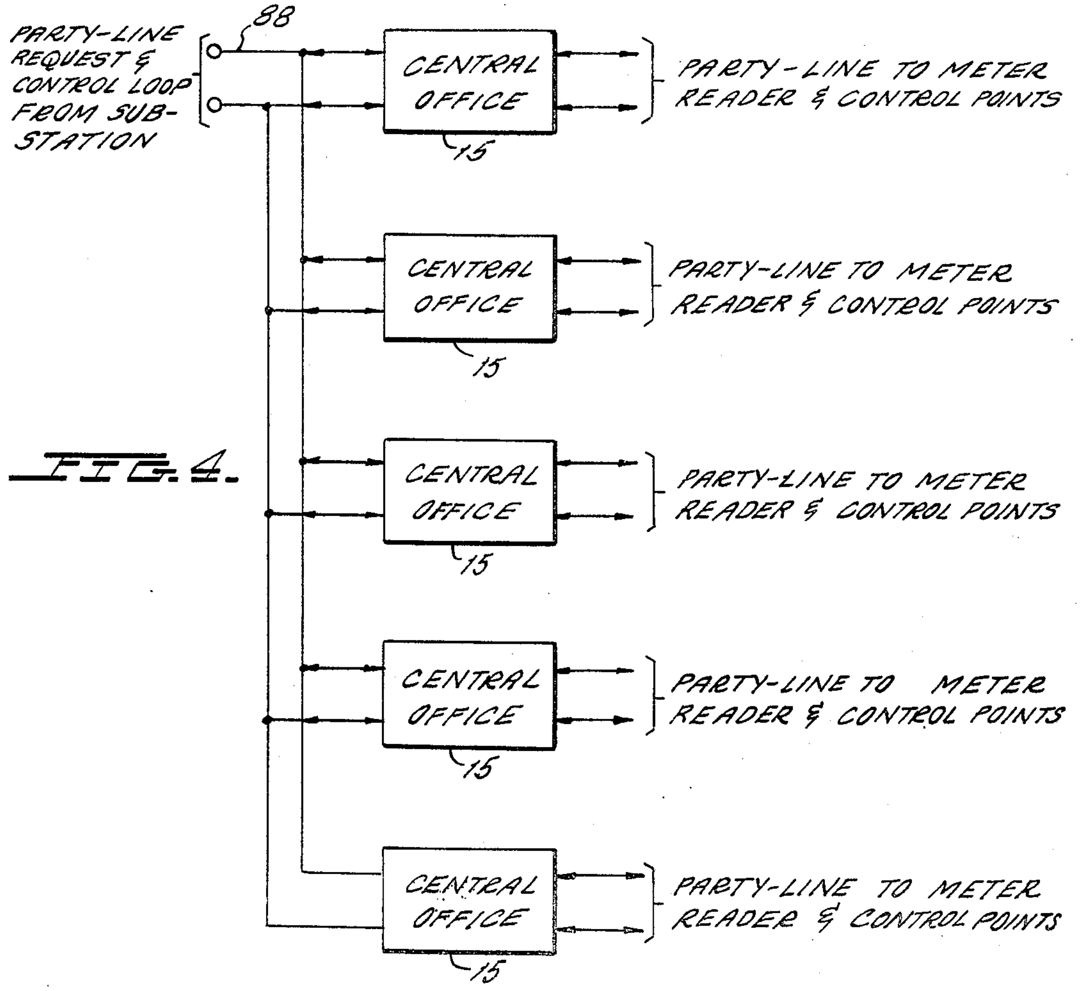

FIGURE 4 is a block diagram showing the central station locations and the manner of their connection to the substation in greater detail.

Figure 5:
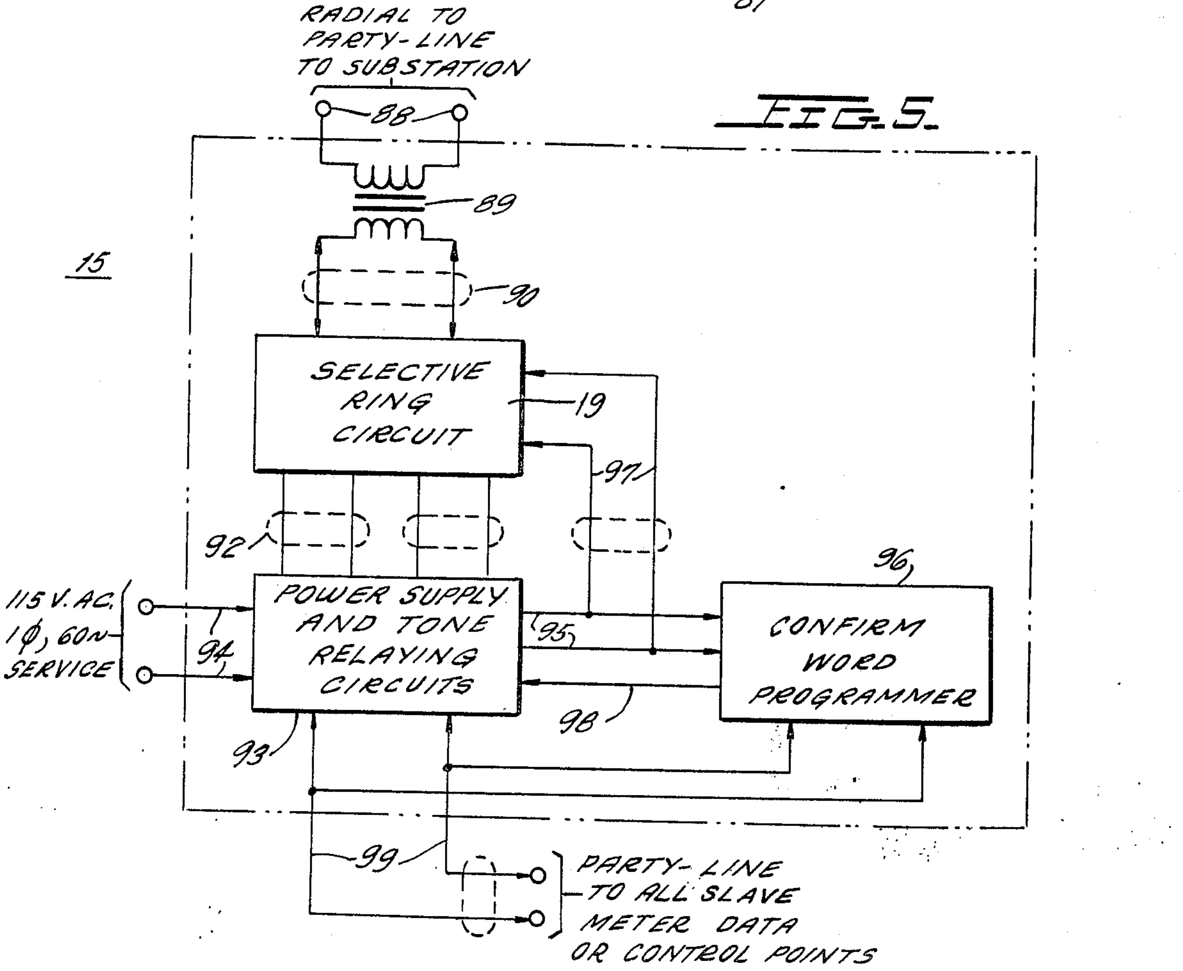

FIGURE 5 is a block diagram showing the arrangement of a central station in greater detail.

Figure 6:
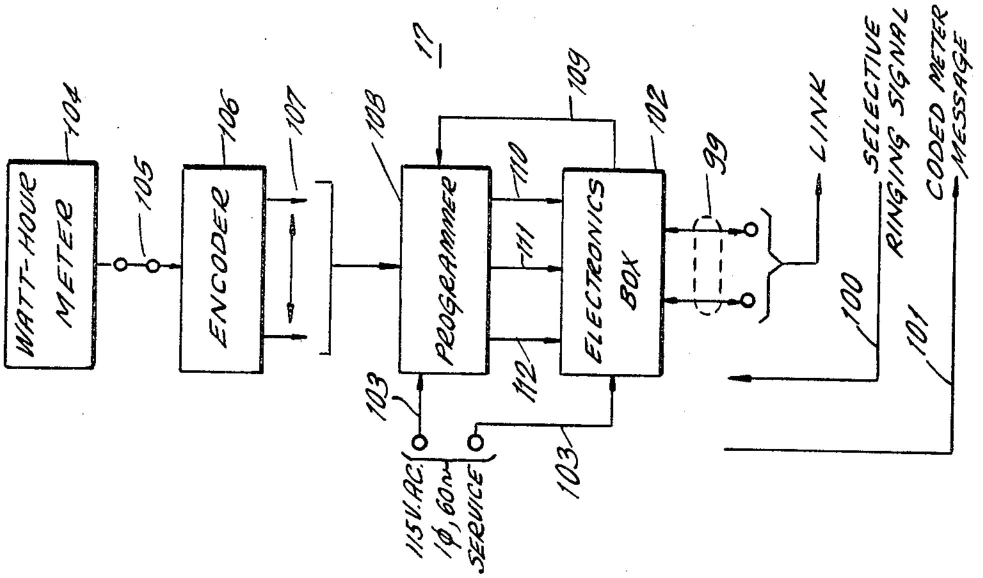

FIGURE 6 is a block diagram showing a single message meter reading point.

Figure 7:
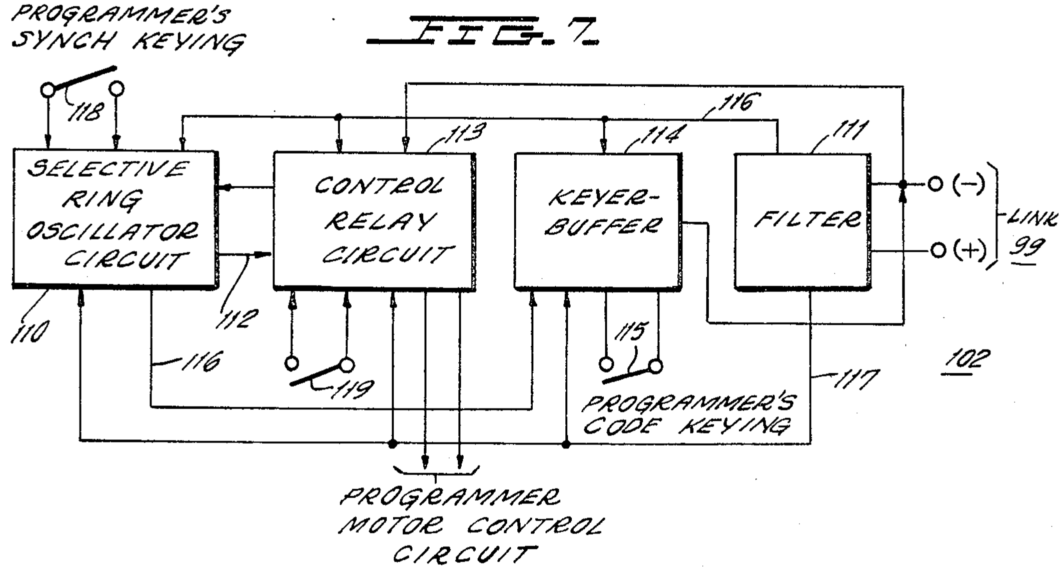

FIGURE 7 is a block diagram of the meter point electronics.

Figure 8:
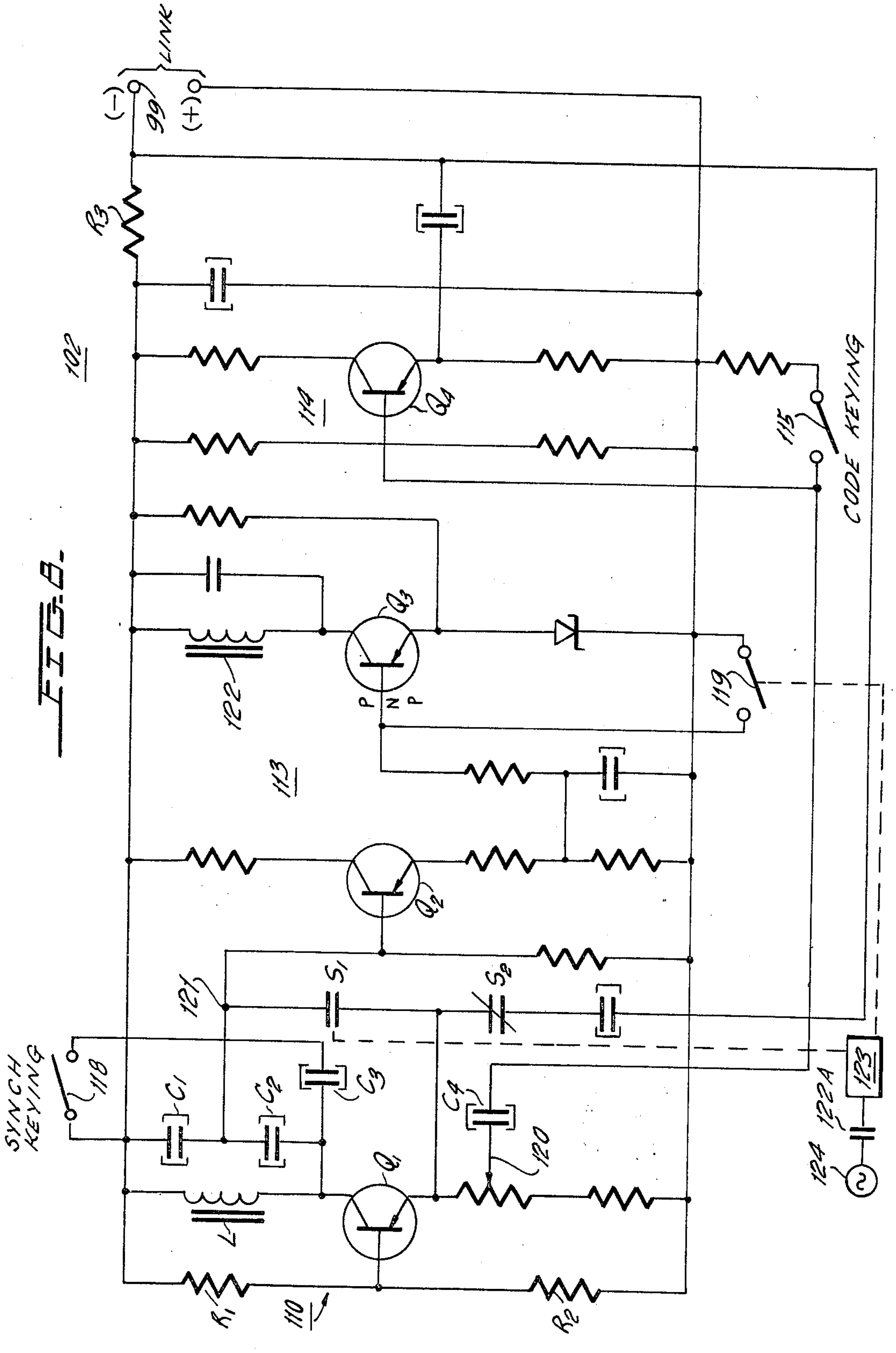

FIGURE 8 is a schematic diagram showing the meter electronics of FIGURE 7.

Figure 9:
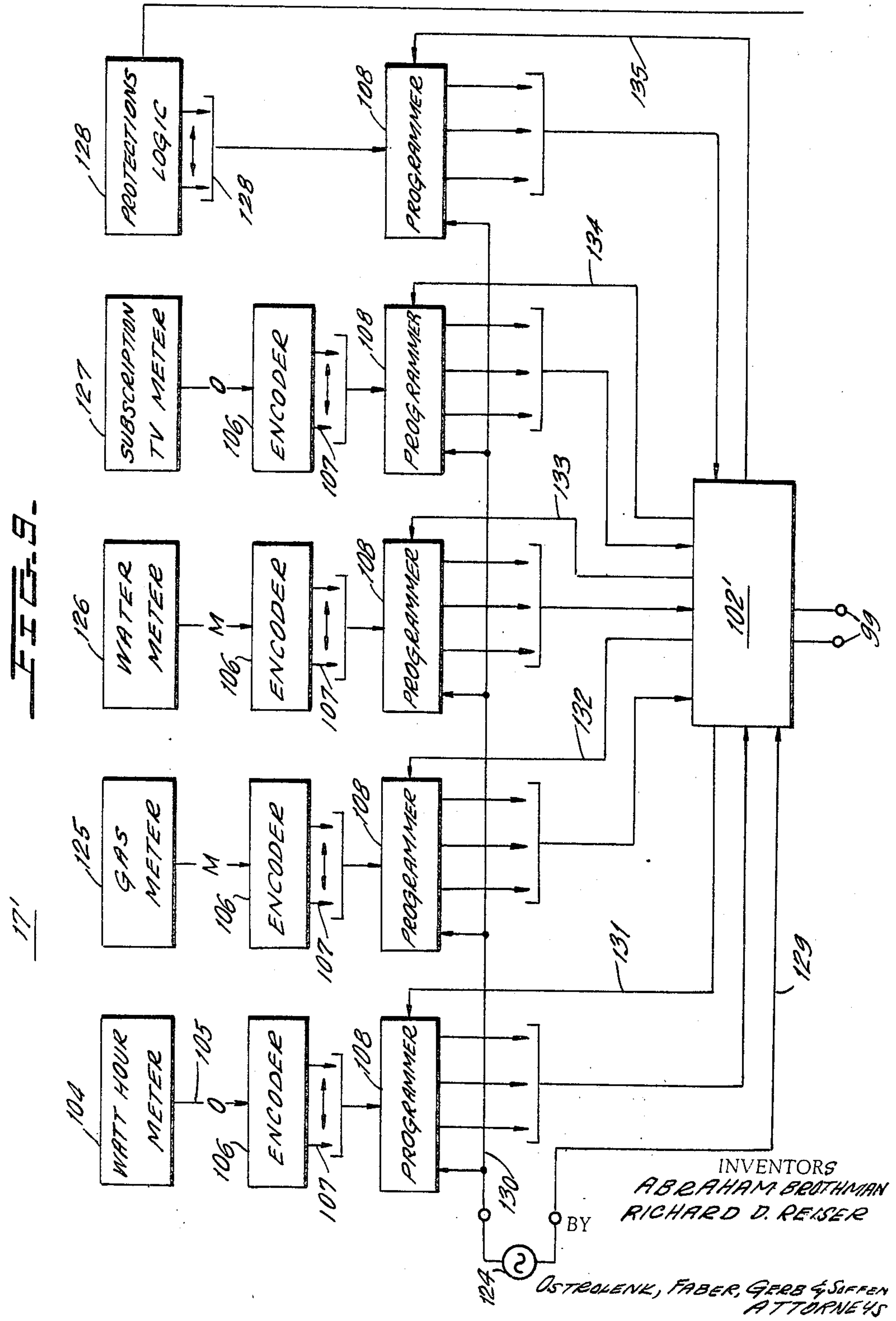

FIGURE 9 is a block diagram showing a meter location having a plurality of meter points.

FIGURE 10 is a chart showing the binary coding system employed in the instant invention.

Referring now to the drawings, FIGURE 1 shows a meter reading system network 10 comprised of a data processing center 11 which operates to contact each remote station and further which receives all of the information transmitted upon demand from each remote location. The data processing center 11 is coupled to a plurality of substation systems 12 which are each coupled to the processing center 11 through the radial lines 13. It should be understood that as many or as few substations could be radially linked to the processing center as are required. Each substation such as, for example, the substation 12′ is coupled in party line fashion, through a common bus 14 to a plurality of central stations 15 with as many or as few central stations being used as is required by the system size. Each central station 15 may be positioned either underground or on a pole top and is coupled to bus 16 and a plurality of remote metering points 17 which are connected in common or party line fashion to bus 16. Typical remote metering points may, for example, be individual house or apartment locations designed to generate binary data representative of utility meter readings, subscription TV meter readings, and the like. Remote metering points 17 may also comprise means for transmitting protection or monitoring logic such as, for example, var meter, power factor readings, and the like, which are useful in monitoring equipment at remote locations. Each metering point may, in addition, be provided with means for transmitting a plurality of readings at an individual remote location such as, for example, gas, electric and water meter readings.

Briefly, the operation of the system 10 is such that the processing center 11 initiates a sweep of remote metering locations by the generation of first and second identifying codes. The first identifying code is employed to operate means to be more fully described, which selects the particular line 13 to establish which substation is to be connected to the processing center. The second code is employed for the purpose of requesting the substation to connect a particular central station which is coupled with the selected substation 12 to the processing center 11.

Upon receipt of the second code generated by the processing center at the selected substantion to which it has been routed, the substation undergoes an examination of the code to establish its validity. If validity of the code is established the substation acknowledges receipt and validity of the code by transmitting back to the processing center its identifying code.

The substation then undertakes to transmit the central station identifying code simultaneously to all of the central stations connected to the substation to establish connection therebetween. The central station identified by that code then becomes energized and acknowledges the validity of receipt of the identifying code by transmitting its identification address back to the data processing center by means of its associated substation location which acts to acknowledge receipt of a valid identifying code. The central station or pole top location then sweeps all of the remote metering points connected in common with the central office by sequentially transmitting a plurality of different tone frequencies which, in turn, energizes one and only one of the remote metering points at any given instant.

Upon receipt of its identifying tone, the remote metering point becomes energized to transmit its identifying address and its metering information back to the data processing center at which time, upon completion thereof, the remote metering point transmits an end of message signal and automatically shuts itself off.

The metering point data transmitted to the processing center is receiver, checked for validity and translated into a second code format for ultimate readout into any desired storage means such as: magnetic tape, punched paper tape, punch cards and the like. Alternatively, the data may be routed to a computer facility for immediate processing thereof with the alternatives selected being dependent only upon the needs of the user.

In cases where the substation facility receives an invalid code an error indicating signal is transmitted back to the processing center which initiates a repeat of the transmit request from processing center to the substation.

FIGURE 2 shows the processing center 11 in greater detail. The data processing center 11 is comprised of a counting means 20 which may be either a manually operated or automatic electronic counting means for continuously generating a decimal count. This count is coupled to a program center 21 which converts the decimal count received at one of its plurality of input lines 22 to generate a code at its output 23 representing the particular substation which is to be signaled and generates a code at its output 24 representing the particular party line link which is to be selected.

These code signals are impressed upon the station select circuit 25, which under control of the code from output 23, impresses a code developed at its output 26 upon a concentrator 27 which couples one of its group of outgoing lines 28 to the tone carrier transmitter circuit 29.

Simultaneously therewith the station select circuit 25 impresses the signals received from the output 24, of program center 21 upon the tone carrier transmitter circuits 29 through its outputs 30 that the code representative of the particular party line to be signaled energizes predetermined tone carrier transmitters each of which generate a predetermined tone frequency which is keyed by these signals appearing at the output 30 of the station select circuit 25.

As shown in FIGURE 3*d*, each tone carrier transmitter **29*a* is comprised of an oscillator stage 31 designed to operate at a predetermined frequency rate and which is coupled through a keying stage 32 to filter means 33. Keying stage 32 receives at its control input 32*a* binary signals acting to either isolate oscillator 31 or gate oscillator 31 through keying stage 32 to filter 33. The filter 33 permits all frequencies within its band pass to pass through the power stage 34. The filter means 33 is preferably designed to pass the frequency signal of oscillator 31 and to attenuate any other frequency such as, for example, harmonics of the oscillator frequency. Power stage 34 couples the tone frequency signals to the concentrator circuit 27**.

Thus, the particular output line from the group of output lines 28 selected by concentrator circuit 27 which may, for example, be a rotary stepping switch, couples the tone frequency outputs from the group of one carrier transmitters 29 which are keyed under control of the station select circuit 25 out through the selected line to the substation connected with that selected line.

Concentrator circuit 27 also couples the selected substation to tone carrier receiver circuits 35 which are designed to receive data from the substation connected to the concentrator 27 for subsequent gathering and processing of the data at the date processing center. A typical tone carrier receiver **35*a*** is shown in FIGURE 3*d* and is comprised of a band pass filter 36 which is designed to pass a particular frequency and no other and which imposes this signal when received upon an amplifier 37 to provide sufficient gain to the incoming signals which then undergo detection and demodulation by circuits 38 and 39, respectively, so that the incoming information which is in the form of either an amplitude modulated carrier frequency or a frequency or phase modulated carrier frequency is converted into binary pulses having the first level to represent the binary zero state and the second level to represent the binary one state.

The tone carrier receivers 35 also receive synchronizing signals from each substation location which are demodulated and detected in the same manner as data signals. The synchronizing and data signals appear at the outputs 40 and 41 respectively, where they are impressed upon data receiver 42 which operates to load the incoming data bits into register means until a character is received; check the data bits representing a character for their validity and either identifying a character as being erred, thus requiring a repeat transmission, or shift valid coded characters into a buffer storage means 45. A detailed description of data receiver 42 will subsequently be given in connection with FIGURE 2.

As was previously described, each remote location transmits a coded data representative of a meter reading which is preceded by coded data representative of the identifying code or address of the remote location which is transmitting. The remote location identifying code is coupled through data receiver output 43 to the station select circuit 25, while the remote location identifying code together with the meter reading data is coupled through the output 44 into the buffer storage means 45.

The buffer storage means 45 may be any suitable memory means such as, for example, magnetic core, magnetic drum, or flip-flop memory means having suitable storage capacity in order to accommodate for any difference in operating speed between the rate at which data is being received and the rate at which the data is being analyzed and processed.

The buffer storage means also stores an error indication received from output 46 of data receiver 42. The buffer storage means may be unloaded by feeding stored data into a magnetic tape means 47 and subsequent thereto a data-to-card converter 49 through its output terminals 48 which may prepare punch cards for either billing or subsequent processing purposes.

In the case where the substation selected by data processing center 11 acknowledges receipt of a valid transmit request signal by transmitting its own identifying code, the binary data representative of this identifying code is coupled through its output 44 to the input of controller buffer circuit 50. The next address to be selected appears at the output **25*a* of station select circuit 25 and is impressed upon controller buffer circuit 50 and, upon receipt of the substation acknowledge signal, couples the output 51 of buffer circuit 50 to encoder 52, so as to generate the first and second groups of binary data at the outputs 53 and 54 of encoder means 52 so as to be passed through the station select circuit 25** in order to request the next substation to transmit at the same time that the first substation responding to transmit request signals is sending back its data. This operation is permissible due to the two-way talk-listen circuit provided and shown in FIGURE 3, which will be more fully described.

If the identifying code transmitted from the substation back to the data processing center 11, after being checked for its validity at the data receiver 42 proves to be an invalid code, data receiver 42 transmits a signal over its output 55 to the program center 21 requesting a re-transmission of the original station select code. If the substation code received by data receiver 42 proves valid, its output 55 causes the program center 21 to step to the next remote location to be selected which due to the use of the controller buffer and encoder circuits 50 and 52 respectively, will actually select the second remote location to be selected after the remote location now being requested to transmit since the first remote location to be selected after the remote location now being requested to transmit is accommodated by means of the controller buffer circuit 50 and the encoder means 52.

FIGURE 2*a* shows the block diagram of the data receiver 42 in greater detail. The data receiver 42 receives the data bits at its input terminals 56, which data bits are impressed upon a bit sampling circuit 57 with the data bits being received from one of the tone carrier receiver group 35. The synchronizing data bits are received at the input terminals 58 and are impressed upon a synchronization function circuit 59. Sync bits are received from a second of the tone carrier receivers in tone carrier receiver group 35. The bit sampling circuit 57 functions to establish the zeroness or oneness of a received data bit and may, for example, employ the bit sampling means described in copending applications entitled "Self Optimizing Terminal," Ser. No. 279,107, filed May 9, 1963 by A. Brothman et al. and "Quaternary Decision Logic," Ser. No. 324,956, filed Nov. 20, 1963 by A. Brothman et al., now U.S. Patent No. 3,349,371 both of which applications are assigned to the assignee of the instant invention.

Basically the circuit employed utilizes statistical data such as link past history coupled with examination of portions of each data bit to establish its classification as either a binary zero bit, binary one bit, or a gray zero or gray one bit.

Each data bit, after being so examined, is passed through the output 60 of its sampling circuit 57 into a data characters shift register 61. The synchronizing data bits appear at the output 62 of the synchronization circuit 59 for the purpose of resetting the bit sampling circuit 57 and for acting as shift pulses to load the data bits into shift register 61. The output 63 of shift register 61 is impressed upon the synchronization function circuit 59 for the purpose of maintaining word synchronization so that a gray bits per character count may be developed and recorded.

As soon as all the data bits representing one coded character are shifted in to shift register 61 they appear at the output terminal group 64 and are impressed upon error monitor logic circuit 65 to establish the validity of the received character which was loaded into shift register 61. In one preferred example, each coaded character transmitted from a remote location which is comprised of four binary bits, for example, is further accompanied with a fifth parity bit for the purpose of establishing odd or even parity for each coded character. The error monitor logic circuit 65 generates its own parity bit by examining the data bits comprising the received character and comparing this against the parity bit accompanying the encoded character. If the coded character fails the parity check, a signal appears at the output 66 of error monitor logic circuit 65 which acts to first indicate that an error has occurred and further is employed for the purpose of requesting a repeat transmission. This output terminal is coupled to the output terminal 55, shown in FIGURE 2, to impress a signal upon the program center 21 to indicate that a repeat transmission is required. Output 67 of the logic circuit 65 acts to reset shift register 61. The output terminal 68 inpresses the received character upon a code translation logic circuit 69. Output 70 generates a bit to indicate that an error occurs in the received character. This bit accompanies the received character and tags it as an errored character. The code translation logic circuit 69 converts the binary code employed during the transmission operation into a second code more suitable for evaluating and processing characters and impresses the converted code bits upon intermediate memory 71 through its output terminals 72. The code translation logic circuit 69 has output terminal 73 which couples the errored character indication into the intermediate memory circuit 71.

The intermediate memory circuit 71 may, for example, be comprised of a multi-stage register which may receive all of the bits from code translation logic circuit 69 in simultaneous parallel fashion for storage therein prior to transfer of the received character into the buffer memory. The output terminals 74 and 75 of intermediate memory 71 impress the code bits and error bits respectively upon the buffer memory circuit 45 shown in FIGURE 2. When the received character has successfully been loaded into the buffer memory circuit the circuit generates an output which is impressed upon the input terminal 76 of intermediate memory 71 so as to reset the intermediate memory circuit in readiness for receipt of the next coded character.

FIGURE 3 is a block diagram showing one of the substation systems 12 of FIGURE 1 in greater detail. The substation system is comprised of input terminals 13 receiving the transmit request signals from the data processing center 11 through its concentrator 27. These signals are impressed upon a talk-listen circuit 77 which is so designed as to enable simultaneous two-way transmission to occur between the data processing center 11 and a remote location 17 (see FIGURE 1) through the substation 12.

The talk-listen circuit 77 is shown in greater detail in the block diagram of FIGURE 3*a* and is comprised of a transformer T1 having its primary connected to the link 13.

Signals to be transmitted are impressed upon talk input 150. The input 150 couples the signals to phase splitter 151 which converts a talk input, such as waveform *a,* into two equal amplitude 180°-out-of-phase outputs, such as waveforms *b* and *c*. At amplifiers A and B, waveforms *b* and *c* become wave forms *d* and *e*, respectively. Correspondingly, at amplifiers A′ and B′, waveforms *b* and *c* become waveforms *e* and *d*, respectively, due to the crossover of feeds to amplifiers A′ and B′ relative to A and b. Relative to the "link," sides of transformers T1 and T2, waveforms *d* and *e* are reinforcing and produce the outgoing talk-information in the link 13. Under the condition in which amplifiers A, A′ and B, B′ are identically loaded by transformers T1 nad T2, waveforms *d* and *e* at the corresponding sides of transformers T1 and T2 are in a cancelling relationship relative to the resistor strings R38–R24–R25 and R34–R26–R27; and accordingly, the outgoing talk-information is nulled out at the slide arms R24*a*+R26*a* of R24 and R26, respectively.

Relative to an incoming signal from the link, such a signal induces equal amplitude 180°-out-of-phase signals at the center-tapped side of transformer T1, resulting in signals *g* and *h*. With transformer T2 receiving no information from its dummy load 152 and with the output-to-input isolation of ampilfiers A, B, A′ and B′, the waveforms *g* and *h* appear as *g*/2 and *h*/2 at the inputs of the listening amplifier 143. To the listening amplifier 153, *g*/2 and *h*/2 are reinforcing signals, and appear as a single listening output at the output-side of this amplifier.

FIGURES 3*b* and 3*c* form a schematic diagram, arranged in the manner shown in FIGURE 3*e*, for the talk-listen circuit of FIGURES 3 and 3*a*. The input talk-waveform is impressed at one of the input terminals 150*a*–150*f*. These inputs are impressed upon individual mixer circuits 155*a*–155*f* which permit up to six inputs to be impressed upon the talk-listen circuitry. Each mixer circuit is basically comprised of a transistor Q101–Q601, respectively, all of which have their collector electrodes coupled in common to bus 156. Adjustible resistor R5 is provided for the purpose of adjusting the injection level of the incoming signals.

The input talk-waveforms are coupled to the base of transistor Q2 via capacitor C3. This waveform appears in an in-phase relationship to the input at the emitter of Q2, and in inverted form in the collector of Q2. The in-phase output is directly coupled to the base of emitter follower Q3 and the inverted output is directly coupled to the emitter follower base of transistor Q4. The emitter loads R11 and R12 in emitter circuits Q3 and Q4, respectively, are comprised of potentiometers to permit adjustment of the two output waveforms to obtain equal amplitude signals. The output of the Q3 stage is delivered to the base of the Q9 gain stage via conductor 157, capacitor C12 and conductor 158. This signal is also coupled via conductor 157 and capacitor C16 to the base of the Q12 gain stage. The Q9 stage may be thought of as the B′-amplifier of FIGURE 3*a,* while the Q12 stage would then be the A-amplifier.

The output of the Q4 stage is delivered via conductor 159 and capacitor C14 to the base of the Q10 gain stage, as well as being coupled to the Q11 gain stage through capacitor C15. Here, the Q10 gain stage plays the part of the A′-amplifier of FIGURE 3*a,* while the Q11 gain stage assumes the role of the B-amplifier.

Amplifier stages Q9, Q10, Q11 and Q12 develop the inverted forms of their respective inputs in their collectors. All four amplifiers have equal design parameters and, with dummy loading on transformer T2 consisting of resistor R23 and capacitor C13 adjusted to match the link characteristic impedance, the talk-waveform developed across resistor R27 by transistor Q9 is equal in amplitude but 180° out-of-phase with the talk-waveform developed across resistor R34 by transistor Q11. Similarly, the talk-waveform seen by resistor R25 at transistor Q10 is in an equal amplitude but 180° out-of-phase relationship to the talk-waveform seen by resistor R38 at the Q12 collector. At the midpoints of the R38–R24–R25 resistor string and and the R34–R26–R27 resistor string, the opposed excitations at both ends of the strings exactly cancel. The midpoint adjustments to obtain desired nulling are provided for by resistors R24 and R26 which are comprised of potentiometer means. Relative to transformer T2, the equal amplitude, but opposed waveforms at the Q9 and Q10 collectors are reenforcing, and similarly, the equivalent opposed waveforms at the Q11 and Q12 collectors are also reenforcing relative to transformer T3.

Accordingly, the output talk-information to the link 13 via transformer T3 appears in the link, while it is effectively removed relative to the midpoints of the Wheatstone strings described above.

Incoming listen-information is impressed upon link 13 and appears on the link-side of transformer T3, which develops opposed phase but equal amplitude waveforms at both end terminals of the center-tapped side of transformer T3. These signals appear at the collectors of transistors Q11 and Q12 but have no effect whatsoever as to the operation thereof due to the inherent isolation between output to input of amplifier circuits.

The equal but opposite phase signals are likewise coupled through resistors R34 and R38 to become the excitation to the two sides of the Wheatstone bridge. With no corresponding input from the dummy loading circuit coupled across the secondary of transformer T2, the two listen-waveforms appearing at the end terminals of transformer T3, appear in halved amplitude form at the slide arms R24*a* and R26*a* of resistors R24 and R26, respectively, to then become inputs via conductors 160 and 161, respectively, and capacitors C4 and C10, respectively, to the Darlington emitter follower circuits Q5–Q6 and Q8–Q7, respectively.

The outputs from the Darlington emitter followers are taken at the emitters of transistors Q6 and Q7 and are coupled via capacitors C7 and C9 to the primary of transformer T1. These opposing phase listen-waveforms become reenforcing inputs relative to the secondary of transformer T1. At the secondary of transformer T1, the output listen-waveform is capacitively coupled via conductor 162 and capacitor C18 to the emitter follower circuit comprised of transistors Q13 and Q14, to become the output listen-information at the Q14 emitter electrode.

Returning now to the substation system 12 of FIGURE 3, the output 79 of talk-listen circuit 77 is simultaneously impressed upon tone receiver circuit 80 comprised of a plurality of individual tone receiver sets of the type previously described. The output at terminals 79 is also impressed upon the input of the substation concentrator circuit 81 which operates to connect the selected substation to a particular substation line.

The outputs of tone receiver sets 80 appear at 82 and are impressed upon the input terminals of decoding logic circuit 83. The decoding logic circuit 83 examines the transmit request code to establish its validity. If the received code proves valid, decoding logic circuit 83 generates the identifying code for its substation which appears as the output terminals of 84, and are impressed upon the tone transmitter sets 85. The tone transmitter sets 85 are comprised of a plurality of tone transmitters of the type shown in FIGURE 3*c*, which generate a combination of predetermined tones under control of the identifying code information received from the decoding logic circuit 83. These tones appear across at output terminals 86 of the tone transmitter sets 85 and are impressed across the input terminals 87 of talk-listen circuit 77. As was previously described, the transmission of the substation identifying code acts to indicate that a valid transmit request signal for the substation of FIGURE 3 has been received and decoded and that the substation 12 will enter into the next system phase of operation which is that of coupling the substation 12 to the particular central office.

Upon receipt of a valid transmit request code, the output terminals 88 of decoding logic circuit 83 are coupled to the substation concentrator 81 so as to gate through the transmit request code signals appearing at the output terminals 79 of talk-listen circuit 77 through to the substation concentrator 81. Upon receipt of an invalid code, the signals will be blocked from energizing substation concentrator 81 through the output 88 of decoding logic circuit 83.

Considering both FIGURES 3 and 4, it can be seen that the substation concentrator 81 is coupled through the link 88 so as to be connected in common with all of the central stations (i.e. pole tops) 15 shown in FIGURE 4.

The substation concentrator 81 can operate to sequentially generate the identifying code for each central station 15 connected to it on a one-at-a-time basis. This is required since all central stations 15 are connected in common to the substation concentrator and some means must be provided for energizing one and only one central station or pole top 15 at any given instant.

As the proper transmit request signal combination for signaling each central station or pole top 15 is simultaneously received by all of the central stations connected to the substation concentrator, only one of the pole top locations 15 such as, for example, that shown in FIGURE 5 will respond to this code. As shown in FIGURE 5, the pole top 15 is comprised of transformer means 89 for A.C. coupling the substation concentrator to the pole top 15. The secondary of transformer 89 is coupled through conductors 90 to a selective ringing circuit 91 which is so designed as to be responsive to only a predetermined coded combination of tones so as to be energized. Upon the occurrence of the appropriate tone signals the selective ring circuit 19 couples its output 92 to the power supply and tone relaying circuit 93 causing the circuit to be energized through a local 115 volt A.C. source in order to begin its operation. Thus power is coupled across the input terminals 94 of circuit 93.

At this time the A.C. power coupled through circuit 93 and its output terminals 95 to the confirm word programmer circuit 96 which is designed to transmit the identifying code for the pole top location 15 through the output terminals 97 and selective ring circuits 91 to the link 88. The transmission of identifying code for the central station 15 of FIGURE 5 indicates that a frequency selective signal capable of energizing the selective ring circuit 91 has been received and the central station (pole top) 15 is going through a transmission state. Upon completion of the confirm word transmission, the programmer 96, coupled to circuit 93 through output 98, impresses a signal upon circuit 93 causing it to impose a frequency selective signal through its output terminal 99 upon all of the individual meter reading points which are coupled in common across the conductors 99. The connection between the central station 15 and the individual remote metering points is substantially identical to that shown in FIGURE 4 which exist between the substation and the central stations.

FIGURE 6 shows the block diagram for a single message meter reading point 17. The remote meter location 17 is comprised of input terminals 99 connecting the remote metering point 17 to the link. Incoming signals follow the path designated by arrow 100 and represent the selective ringing signal while out going coded meter messages follow the path shown by arrow 101. The incoming signals are impressed upon the meter point electronic circuit 102 which, upon receipt of a selective ringing signal to which it is designed to respond, causes the 115 volt A.C. local source to be coupled through its input 103 to the electronic circuit 102 to permit initiation of the transmission phase.

The single message meter reading point 17 is further comprised of a meter 104 such as, for example, a watt-hour meter, which develops a cumulative reading based upon the number of watt hours used at location 17. The output of the watt-hour meter 104 is coupled through 105 to an encoder means 106 which preferably is a shaft angle analog-to-digital encoder means. A preferred encoder means which may be employed in the arrangement of FIGURE 6 as set forth in detail in U.S. Patent No. 3,165,733 entitled "Code Stack Assembly," issued Jan. 12, 1965 by A. Brothman et al. or in the application entitled "Meter Register Gear Encoder," Ser. No. 353,362, filed Mar. 20, 1964, by A. Brothman et al., now U.S. Patent No. 3,314,063 both of which applications are assigned to the assignee of the instant invention.

For the purpose of the instant invention it is sufficient to understand that the encoder means 106 which is coupled to the watt hour meter output dials of meter 104 acts to generate binary coded information at its output terminals 107 which represent the shaft angle positions of the dials. These binary bits are impressed in parallel and simultaneously upon a programmer means 108 which may be of the type set forth in detail in U.S. Patent No. 3,219,758 entitled "Data Transmitter," issued Nov. 23, 1965 to A. Brothman et al., and U.S. Patent No. 3,196,213 entitled "Multiple Tone Transmitter," issued July 20, 1965 by A. Brothman et al., all of which patents and applications are assigned to the assignee of the instant invention. Again, for the purpose of understanding the instant invention, it is sufficient to understand that the programming means 108 operates to sequentially transmit, through electronics box 102, the binary coded information which is impressed in parallel fashion upon the input to programmer 108.

The operation of the circuit is such that, upon receipt of the selective ringing signal representative of a transmit request, electronics box 102 through its output 109, causes the programmer 108 to be energized by the local 115 volt A.C. source. The electronic circuit 102 is provided with an oscillator means which is selectively energized and/or cut off by programmer 108 so as to transmit the data from the remote point 17 to the data processing center (through the central office, i.e., pole top and the substation connecting the remote location 17 to the data process center 11).

The programmer 108 is also pre-wired in such a way as to first transmit its own identifying code and then transmit its meter reading through its output 110 interspersed with the data bits, the programmer 108 transmits synchronizing information from its output 111 to the electronic circuit 102. In a typical application the programmer 108 completes its transmission cycle through one complete sweep of its rotary arm (not shown). At the completion of this sweep its output 112 acts to deenergize electronics box 102 causing the remote metering point 17 to be disconnected from the link. It is also typical to transmit a "Long" tone just prior to the completion of transmission indicative of the fact that a transmission from the remote metering point 17 is now complete.

A detailed block diagram of the electronics circuit 102 of FIGURE 6 is shown in FIGURE 7 wherein the incoming link 99 is impressed upon a selective ring oscillator circuit 110 which is designed to begin oscillation only upon the receipt of a signal of the same frequency to which the oscillating circuit is tuned. This signal is impressed upon the oscillator circuit through the filter means 111. The output of the oscillator circuit which has thus become energized appears at 112 and is coupled to the input of a control relay circuit 113 causing energization of the relay in order to initiate energization of the programmer means. The circuitry is such that the control relay solenoid, upon energization thereof, causes a closure of its associated contacts (not shown) to close a circuit between a local 115 volt A.C. source and the programmer motor means. The programmer motor causes the programmer means to go through a transmitting sweep so as to sequentially step out data and synchronization information which in turn is impressed upon the keyer buffer circuit 114 by means comparable to a contact closure represented by the movable contact 115 of FIGURE 7.

The output of the oscillator circuit 110 appearing at 116 is thereby impressed upon the input of the keyer buffer circit 114 which blocks passages of tones therethrough to link 99 when the contact 115 is closed and which passes the tones to the link 99 when the contact 115 is in the open position, which position is shown in FIGURE 7. D.C. power for energization of the circuits 110, 113 and 114 is derived from the link 99 and appears at the outputs 116 and 117 of filter 111 to be impressed upon the circuits 110, 113 and 114 as shown in the figure.

The sync data bits are coupled to oscillator circuit 110 in such a manner as to change its operating frequency. This coupling is analogous to a contact closure arrangement represented by to movable contact arrangement 118. When contact 118 is in the position shown in FIGURE 7, the oscillating circuit operates at a first frequency rate. When the contact 118 moves to the closed position, the oscillator circuit operates at a second frequency rate.

As the programmer means nears the completion of its transmission sweep, the equivalent of a contact closure occurs in order to short out or deenergize the operation of the oscillator circuit. This is represented by the movable contact 119 which is normally in the open position as shown in FIGURE 7 to permit energization of oscillator circuit 110. When the programmer nears completion of its transmission sweep, contact 119 moves to the closed position for a predetermined period of time sufficient to deenergize oscillator circuit 110 and hence, deenergize the electronics circuit 102.

A detailed schematic of electronic circuit 102 is shown in FIGURE 8. In the circuit 102 of FIGURE 8 A.C. signals appearing at the link terminals 99 are impressed across the selective ring oscillator circuit 110 comprised of transistor Q1 having a tank circuit connected to its collector electrode comprised of capacitors C1 through C3 which are connected in parallel across inductance L. When a tone signal of the frequency to which the oscillator circuit 110 is tuned, is impressed across the link terminals 99, this causes the oscillator circuit 110 to undergo oscillation thereby generating a tone frequency at its output terminals 120 and 121. The output 121 is coupled to the base of transistor Q2 forming the control relay circuit 113 and which is connected in emitter follower fashion to provide suitable current for driving transistor Q3. Transistor Q3, when energized, causes energization of relay 122 which in turn causes its associated contact set 122A to couple the local power source to the programmer 108 shown in FIGURE 6. The relay 122 remains energized under control of oscillator circuit 110 until termination of the transmission cycle to be more fully described.

The relay 122 operates its contacts 122A so as to couple the power source 124 with the motor means 123 of the programmer 108. Energization of the programmer motor means 123 causes this motor to rotate its output shaft which is mechanically linked with switches S1 and S2. Initially the switch S2 is in the normally closed position. Switch S1 is in a normally open position. Movement of the motor shaft of programmer motor 123 causes switch S2 to become opened and switch S1 to become closed. Prior to the opening of switch S2 the incoming transmit request tone is coupled therethrough to the emitter of transistor Q1 so as to permit energization of the oscillator circuit. The energization of the circuit, in turn, energizes relay 122 which causes operation of motor 123 which, after a brief predetermined time period, opens normally closed switch S2 and closes normally open switch S1 so as to disconnect one terminal of the link input from the emitter electrode of transistor Q1 so as to provide an oscillating feedback path between the tank circuit and the emitter of transistor Q1.

The output of transistor Q1, taken from terminal 120 connected to the emitter of transistor Q1, is connected through capacitor C4 to the base of transistor Q4 comprising the keyer-buffer circuit 114. The output of oscillator 110 thereby causes transistor Q4 to impress this signal across link 99 from its emitter electrode. In order to transmit binary information the circuit employs the presence of the tone generated by oscillator circuit 110 as a binary ONE state. The absence of this tone is in the binary ZERO state. Depending upon the particular code bit being transmitted at any given instant this causes a selective closure of the contact 115 under control of the programmer 108. For example, if a binary ONE bit is to be transmitted, contact 115 remains in the open position, causing the transistor Q4 comprising the keyer-buffer 114 to impress the tone across the link 99. In the case where a binary zero is to be transmitted the contact 115 moves to the closed position causing transistor Q4 to be cut off, thereby transmitting no tone to the link 99.

In order to transmit sync data bits which are interspersed with code bits such that every two data bits are separated by a sync bit, the programmer means alternately transmits sync bits and data bits. Sync is provided for by the contact means 118. Thus, immediately after transmission of a data bit (be it binary ONE or binary ZERO) the next bit to be transmitted is a sync bit. This causes closure of the contact 118 thereby placing capacitor C3 in parallel with the series connected capacitors C1 and C2. This changes the operating frequency of oscillator 110 causing a second tone to be transmitted through keyer-buffer 114 to link 99. It should be understood that contact 115 is always open during the transmission of a sync bit.

When the next data bit is to be transmitted contact 118 moves to the open position removing capacitor C3 from across series connected capacitors C1 and C2 thereby causing oscillator 110 to operate at its first tone frequency. The code keying contact 115 is then either opened or closed dependent upon whether a binary ONE bit ornary ZERO bit respectively, is being transmitted. Thus, it can be seen that the sync keying contact 118 and the code keying contact 115 operate alternately with the sync key contact 118 always being open during transmission of a code bit and with the code keying contact 115 being operated dependent upon the binary state to be transmitted.

When the programmer reaches the end of its transmission sweep a contact pair 119, which is normally in the open position, is closed to operate transistor Q3 of the control relay circuit 113 into cutoff. This deenergizes relay 122, thereby disengaging A.C. power source 124 from motor means 123 which then coasts to a stop. At this time the deenergization of relay coil 122 causes contact pairs S1 and S2 to reset with contact pair S1 being open and contact pair S2 being closed in readiness for a subsequent transmission cycle.

FIGURE 9 shows a multiple message meter reading point 17′ provided for the purpose of transmitting information from a plurality of meters located at one metering point. The multiple message meter point 17′ is comprised of a watt-hour meter 104, encoder 106 and programmer 108 substantially identical in design and function to that shown in FIGURE 6. In addition to the watt-hour meter, there is provided a gas meter 125, water meter 126, and subscription TV meter 127 at the multiple message meter reading point 17′. Each of these meters are provided with associated encoders 106 and programmers 108 substantially identical in design and function to the encoder 106 and programmer 108 in FIGURE 6. It is sufficient to understand that the meters 125–127 need provide an analog output which may be encoded into a binary representation by the associated encoders 106. It is possible, however, to accommodate any other type of meter output by a suitable encoder means to satisfy the objective of providing a binary coded representation of the meter reading in parallel form to be impressed upon the programmer 108. In addition to the meters 104 and 125–127, already described, additional input devices may be provided as represented by the protections logic circuit 128. This may include any other type of data input to the programmer to signify current readings, voltage readings, status of circuit breakers, var meter readings, power factor readings and any other type of conditions which it is desired to monitor. These readings are code converted by the logic circuit 128 to be impressed upon the associated programmer 108 to the output terminals 128. In order to initiate transmission upon demand from the meter reading point 17′ the frequency sensitive signal is connected through the link 99 to the electronics circuit 102′ which, upon receipt of the tone frequency representative of the meter reading point 17′ couples the A.C. power 124, through leads 129, 130 and 131–135 in a sequential fashion. Upon receipt of the tone frequency representative of a transmit request signal the electronic circuit 102′ energizes programmer 108 so as to transmit its identifying code and meter reading in the same manner as previously described. The stopping action contact 119 shown in FIGURE 8 may be replaced by a contact set positioned near the end of the programmer sweep for watt hour meter 104 so as to electrically energize programmer 108 associated with gas meter 125. Each programmer, in turn, is provided with a contact set which is closed near the end of its transmission sweep so as to couple the next programmer to transmit to the electronic circuit 102′. The last programmer 108 of the group coupled with protections logic circuit 128 is then provided with a stopping action contact set 119 of the type shown in FIGURE 8. Thus, an individual location is thereby provided with means for transmitting a plurality of meter readings through a single electronics circuit 102′ simply by inter-connecting the programmers 108 in the sequential fashion described above.

As an alternative it is possible to provide a plurality of electronics circuits 102′ each associated with an individual meter and each provided with its own independent transmit request signal, if so desired. Also a single programmer of the type described in aforemention Patent No. 3,219,758 may be employed for use with all of the encoders which have switching logic to sequentially select each encoder.

A preferred coding system which may be employed in the system of the instant invention is shown in FIGURE 10. In the application where a shaft angular position is divided into ten discrete decimal regions zero through nine, the encoder of the type previously described will generate the code format shown in FIGURE 10. It can be seen that the code is comprised of five binary bits $b_1$–$b_5$, plus an ambiguity bit A. The clear code C for each decimal character is not tagged with an ambiguity bit and is a self-checking type two-out-of-five code. In instances where the pointer of a meter dial face moves in close proximity to the gradation on the dial face separating two decimal characters, this is known to be a difficult position to read visually. Such a position is also noted by the coding system through the generation of a three-out-of-five binary code which is further tagged with an ambiguity bit A. It can be seen where a clear visual reading of decimal "zero," for example, is possible, its binary code is 01010 with no ambiguity bit. As the pointer moves in close proximity to the gradation between a decimal "zero" and decimal "one" position on the dial face, the code makes the transition to a gray code of 11010, which is further tagged with an ambiguity bit A, thereby electronically indicating the close proximity of the dial face pointer to the gradation between a decimal "zero" and a decimal "one" reading on the dial face. While the above code is a preferred form, it should be understood that the encoders using other binary code formats may be employed, depending only upon the needs of the user.

It can be seen from the foregoing that the instant invention provides a system for the gathering and processing of data representing meter readings and protections data information having multiple levels of protection by providing confirm word or acknowledgment transmission at each level of connection between data processing center and the remote message points in order to establish valid connection between the data processing center and the remote points through its associated substation and central office. By providing the transmit-request signal generation among the various levels, this enables the data processing center to establish connection between center and remote points through the utilization of a shorter and less cumbersome transmit request code. By time sharing the communications medium, it is further possible to condition a second point for transmission during the time at which a first point is transmitting, thereby significantly decreasing the amount of time required to gather data from the system. The system design also provides a wide latitude of flexibility enabling additional metering points to be added to the system without requiring substantial changes in the system electronics.

Although there has been described a preferred embodiment of this novel invention, many variations and modifications will now be apparent to those skilled in the art. Therefore, this invention is to be limited, not by the specific disclosure herein, but only by the appending claims.

What is claimed is:

1. A communication system for gathering data comprising a central location;
- a plurality of first level locations coupled to said central location in a radial fashion;
- each of said first level locations having a plurality of second level locations coupled thereto in radial fashion;
- at least one remote location coupled to each of said second level locations;
- said central location being comprised of programming means for selectively coupling said first level location to said central location;
- each of said second level locations having an identifying code;
- each of said first level locations including means storing the identifying codes of its associated second level locations;
- said programming means being further comprised of first means for generating one of said identifying codes and means for transmitting the identifying codes to the first level coupled to said central location;
- said first level location including second means for comparing the identifying code received from said central location with the stored identifying codes;
- third means coupled to said second means for transmitting an acknowledgment signal to said central location upon the occurrence of a valid comparison;
- said third means further comprising fourth means for transmitting the valid identifying code to said second level location;
- said remote locations being further comprised of normally disabled transmission means;
- a selective ringing circuit;
- means at said second level locations for generating a plurality of different signals each identifying an associated remote location;
- each selective ringing circuit being responsive only to its associated signal for energizing its transmitter means; and
- means responsve to activation of its associated selective ringing circuit generating identifying signals representative of an associated remote location for transmission to its associated second level location.

2. A communication system for gathering data comprising a central location;
- a plurality of first level locations coupled to said central location in a radial fashion;
- each of said first level locations being comprised of a talk-listen circuit enabling two way transmission and having a plurality of second level locations coupled thereto in radial fashion;
- at least one remote location coupled to each of said second level locations;
- said central location being comprised of programming means for selectively coupling said first level location to said central location;
- each of said second level locations having an identifying code;
- each of said first level locations including means storing the identifying codes of its associated second level locations;
- said programming means being further comprised of first means for generating one of said identifying codes and means for transmitting the identifying codes to the first level location coupled to said central location;
- said first level location including second means for comparing the identifying code received from said central location with the stored identifying codes;
- third means coupled to said second means for transmitting an acknowledgment signal to said central location upon the occurrence of a valid comparison;
- said third means further comprising fourth means for transmitting the valid identifying code to said second level location;
- a talk-input coupled to an associated first level location;
- and a listen output coupled to an associated first level location;
- phase splitter means coupled to said talk input for generating two outputs 180° out of phase with one another;
- first transformer means coupling said phase splitter output to said talk-listen circuit output;
- dummy load means having a load impedance equal to the load impedance coupled to said talk-listen circuit output;
- second transformer means coupling the outputs of said phase splitter means to said dummy load;
- first voltage divider circuit coupled between one terminal of said first and second transformer means;
- a second voltage divider circuit coupled between the remaining terminal of said first and second transformer means;
- a listen amplifier having first and second input terminals coupled to intermediate points of said first and second voltage divider circuits, respectively;
- said voltage divider circuits forming a bridge circuit adjusted to prevent signals imposed at said talk input terminal from being applied to said listen amplifier while permitting signals imposed upon said talk listen circuit output to be passed by said listen amplifier.

3. A communications system for gathering data comprising a central location;
- a plurality of first level locations coupled to said central location in a radial fashion;
- each of said first level locations being comprised of a talk-listen circuit enabling two way transmission and having a plurality of second level locations coupled thereto in radial fashion;
- at least one remote location coupled to each of said second level locations;
- said central location being comprised of programming means for selectively coupling said first level location to said central location;
- each of said second level locations having an identifying code;
- each of said first level locations including means storing the identifying codes of its associated second level locations;

said programming means being further comprised of first means for generating one of said identifying codes and means for transmitting the identifying codes to the first level location coupled to said central location;

said first level location including second means for comparing the identifying code received from said central location with the stored identifying codes;

third means coupled to said second means for transmitting an acknowledgment signal to said central location upon the occurrence of a valid comparison;

said third means further comprising fourth means for transmitting the valid identifying code to said second level location;

said central location being comprised of concentrator means for selectively connecting said central location to one of said first level locations;

programming means for sequentially advancing said concentrator means;

said programming means including means for generating a second level location identifying code and impressing said code upon the concentrator means for transmission thereof, said central location being further comprised of means for receiving acknowledge signals from said first level locations;

register means coupled to said concentrator for storing said signals;

compare means coupled between said register means and said programming means for comparing said acknowledge signals and the code generated in said programming means for validity;

storage means coupled to said register means;

means controlled by said compare means to shift signals in said register means into said storage means under control of a valid compare signal;

means controlled by said compare means being coupled to said programming means for initiating a repeat transmission of said central location when said comparison is invalid.

4. The system of claim 3 wherein said programming means is further comprised of means coupled to said compare means for advancing the calling program when said comparison proves valid.

5. The system of claim 3 wherein said register means is further comprised of parity checking means and gray bits detection means;

means coupled to said parity checking means and said gray bits detection means for initiating a repeat transmission by said central location when either said gray bits or parity tests are not met.

References Cited

UNITED STATES PATENTS

| | | | |
|---|---|---|---|
| 2,864,943 | 12/1958 | Schultz ---------- | 340—151 X |
| 3,045,210 | 7/1962 | Langley ---------- | 340—151 X |
| 3,300,759 | 1/1967 | Chapman et al. ---- | 340—163 X |
| 3,350,687 | 10/1967 | Gabrielson et al. ----- | 340—163 |

ROBERT L. GRIFFIN, Primary Examiner

W. S. FROMMER, Assistant Examiner

U.S. Cl. X.R.

179—2; 340—151, 163